(12) United States Patent
Cohen et al.

(10) Patent No.: US 6,421,167 B1
(45) Date of Patent: Jul. 16, 2002

(54) MULTIPLE FUNCTION BANDWIDTH MANAGEMENT SYSTEMS

(75) Inventors: Leonard George Cohen, Atlanta, GA (US); David Brian Patterson, Succasunna, NJ (US); James Harold Murdock, Randolph, NJ (US); Brian Charles Moore, Morristown, NJ (US); Adolph Henry Moesle, Murray Hill, NJ (US); Koo Il Kang, Edison, NJ (US); Darlene Louise Hart, Morristown, NJ (US)

(73) Assignee: General Dynamics Advanced Technology Systems, Inc., Greensboro, NC (US)

( * ) Notice: Subject to any disclaimer, the term of this patent is extended or adjusted under 35 U.S.C. 154(b) by 0 days.

(21) Appl. No.: 09/519,037

(22) Filed: Mar. 3, 2000

(51) Int. Cl.[7] .................................................. H01S 3/00
(52) U.S. Cl. ................. 359/337; 359/337.1; 359/337.5; 359/349
(58) Field of Search ................................ 359/349, 124, 359/337.5, 337.1, 337

(56) References Cited

U.S. PATENT DOCUMENTS

| | | | |
|---|---|---|---|
| 5,345,332 A | 9/1994 | deSilva et al. | 359/341 |
| 5,420,948 A | 5/1995 | Byron | 385/37 |
| 5,457,562 A | 10/1995 | Tremblay | 359/188 |
| 5,532,868 A | 7/1996 | Gnauck et al. | 359/332 |
| 5,566,018 A | 10/1996 | Lee et al. | 359/341 |
| 5,602,949 A | 2/1997 | Epworth | 385/37 |
| 5,663,822 A | 9/1997 | Fee | 359/161 |
| 5,673,129 A | 9/1997 | Mizrahi | 359/124 |
| 5,675,432 A | 10/1997 | Kosaka | 359/341 |
| 5,696,615 A | 12/1997 | Alexander | 359/134 |
| 5,718,738 A | 2/1998 | Kohnke et al. | 65/31 |
| 5,726,788 A | 3/1998 | Fee et al. | 359/163 |
| 5,784,184 A | 7/1998 | Alexander et al. | 359/125 |
| 5,815,296 A | 9/1998 | Kubota | 359/133 |
| 5,852,510 A | 12/1998 | Meli et al. | 359/341 |
| 5,861,970 A | 1/1999 | Tatham et al. | 359/161 |
| 5,894,362 A | 4/1999 | Onaka et al. | 359/124 |
| 5,920,423 A | 7/1999 | Grubb et al. | 359/341 |
| 5,943,340 A | 8/1999 | Iemura | 370/431 |
| 5,978,118 A | 11/1999 | Flaherty | 359/127 |
| 5,986,800 A | 11/1999 | Kosaka | 359/341 |
| 6,040,933 A | 3/2000 | Khaleghi et al. | 359/124 |
| 6,049,417 A * | 4/2000 | Srivastava et al. | 359/341 |
| 6,097,534 A * | 8/2000 | Michishita et al. | 359/341 |
| 6,259,555 B1 * | 7/2001 | Meli et al. | 359/337 |

* cited by examiner

*Primary Examiner*—Mark Hellner
(74) *Attorney, Agent, or Firm*—Moore & Van Allen, PLLC; Steven B. Phillips

(57) ABSTRACT

Multiple function bandwidth management systems. Bandwidth-management systems for an optical network are easily assembled by concatenating a plurality of intelligent, miniaturized, bandwidth-management modules (BMM's) together. The BMM's subdivide the wide available spectrum into narrow band segments. Each individual BMM is designed to overcome loss and optimize dispersion, gain, and power or gain equalization for a few channels at a time. Each device includes optical connectors and filters, as well as any other components necessary to direct the band of optical channels through the device's optical path while passing other optical channels within the spectrum to additional devices which can be connected without disturbing existing bandwidth-management modules. Each BMM also includes a digital control module that operates the BMM in any one of a plurality of selectable operating modes.

36 Claims, 17 Drawing Sheets

MULTIPLE FUNCTION BANDWIDTH MANAGEMENT SYSTEMS

BACKGROUND

1. Field of the Invention

This invention relates to optical networks. More particularly, the invention relates to modules that can be used to construct bandwidth-management systems for optical networks. The modules provide gain, power (or gain) equalization, and dispersion compensation on a band-by-band basis, facilitating flexibility in network design and ease of network expansion.

2. Description of the Problem

Fiber optic communication systems, such as those currently used in telecommunication distribution networks, typically require amplification of the signal light to compensate for optical power losses which occur over long distances. This amplification also serves to compensate for losses due to splitting the signal light between different branches of the network. Modern fiber optic communication systems utilize optical amplification devices based on optical fibers which have a core doped with a rare earth, such as erbium. Such a device is commonly known an erbium-doped fiber amplifier (EDFA). These amplifiers are well known in the art. Typical EDFA systems amplify a signal light by passing the signal light through the doped optical fiber while simultaneously pumping the fiber with a relatively powerful laser having a wavelength approximately equal to the absorption wavelength of the rare earth ions. EDFA amplifiers are common in modern optical networks, and have made possible the operation of extremely long networks covering large geographic areas without resorting to electronic regeneration to compensate for losses.

Despite the above advances in optical amplification, long optical spans still suffer from distortion problems that must be corrected if the network is to operate properly. Distortion may arise from a number of sources. Optical fiber systems inherently exhibit a property called dispersion, a pulse-broadening mechanism that reduces the bandwidth of the system. Dispersion may be caused by modal dispersion, in which different modes of a multimode optical fiber propagate at different group velocities. A second type is chromatic dispersion, which results from a combination of material dispersion in the optical glass and geometric effects of the waveguide. Chromatic dispersion causes different spectral components of a signal to propagate at different velocities, inducing pulse spread in high-bit-rate systems.

Once consecutive pulses have spread out so that they are no longer distinguishable from one another, information is lost. Dispersion may be compensated for on a channel-by-channel basis. Various dispersion compensation mechanisms are known. A common dispersion compensation system consists of a length of dispersion compensating optical fiber connected to the system. This special fiber exhibits dispersion characteristics that cancel the dispersion characteristics of the network. U.S. Pat. No. 5,861,970 issued Jan. 19, 1999 provides a good discussion of dispersion in optical networks and is incorporated herein by reference.

Even with known methods of dispersion compensation, dispersion differences between channels lead to non-ideal compensation over all bands. These differences increase with the number of channels and the system length. Dispersion can exceed several thousand picoseconds per nanometer for long-haul systems. FIG. 1 illustrates a dispersion map, a plot of dispersion versus system length. The map of FIG. 1 illustrates approximate dispersion for terrestrial systems using large effective area fiber for 16 channels ranging from 1531 nanometers to 1559 nanometers. In this map, dispersion compensating fibers are used at approximately 80 kilometer intervals. Curve 101 approximates an average dispersion for wavelengths from 1553 to 1559 nanometers, curve 102 approximates an average dispersion for wavelengths of 1540 through 1543 nanometers, and curve 103 approximates dispersion for wavelengths in a range of 1531 to 1533 nanometers. The difference in dispersion compensation, $\Delta D$, for this band of frequencies in this relatively short system is approximately 750 picoseconds per nanometer (ps/nm).

FIG. 2 shows a similar dispersion map as shown in FIG. 1, but for submarine large effective area fiber. Again the dispersion is compensated for using standard single mode fibers every 80 kilometers. Curves 201, 202, and 203, represent average dispersion for the same wavelength ranges as those shown at 101, 102, and 103 in FIG. 1, discussed above. In this case, the difference in dispersion across the bandwidth of the system is approximately 900 ps/nm. As the spectral bandwidth of deployed systems increases, $\Delta D$ will increase, and the required dispersion compensation will vary across the spectrum, making it more and more difficult to design optical networks which provide error-free communication.

Other problems with large optical networks result from inadequate gain equalization. With dense wavelength division multiplexing (DWDM), many channels or transmission signals independent of each other are sent over the same line or optical fiber by multiplexing within the domain of optical frequencies. The transmitted channels are distinguishable from each other because each of them is associated with a specific frequency or wavelength. In an optical network, the different channels must be substantially equivalent to each other in terms of signal level. However, doped fibers, as typically used in optical amplifiers, have an emission spectrum with a peak of limited width; the features vary depending on the glass system into which the dopant is introduced, as well as other factors. The accumulated wide-power variation among channels in DWDM systems can deteriorate the overall system performance significantly. FIG. 3 shows the impact of gain variation with system length for a submarine system, assuming a gain tilt of −0.5 dB to +0.5 dB from short to long wavelengths. For the channels that experience a larger than nominal gain, shown at 301, the channel power grows with system length. As the system length increases, the channel power increases above the threshold, 303, for non-linear interaction of the channels in the fiber. Additionally, the channels that experience a smaller than nominal gain, 302, will lose power with system length. As the system length increases, the channel power will drop below the detection limit 304. For adequate signal recovery with an optical amplifier there should be sufficient optical signal at the input. Operating below the detection limit or above the linear behavior limit results in degradation of the signal and the information on that channel is not recoverable.

FIG. 4 shows a similar graph, but this time, for terrestrial optical systems. Curve 402 represents wavelengths decreasing in power and curve 401 represents wavelengths increasing in power. Operational limits are shown at 403 and 404. Filters are often used to provide gain equalization for optical systems to compensate for the effects described immediately above. Other gain equalization methods exist. Gain equalization is also often referred to as power equalization. U.S. Pat. No. 5,852,510, issued Dec. 22, 1998 provides a good discussion of gain equalization, and is incorporated herein by reference.

The interaction of the various requirements for amplification, dispersion, and gain equalization, as discussed above makes the design and configuration of DWDM optical fiber networks difficult and complex. Accommodating or compensating for one of these factors affects the others, and the effects are not always predictable across the network. The problem is especially acute when network expansion is required. As more modes or channels are added to the network, amplifiers, gain equalizers, and dispersion compensators which previously assured adequate performance, no longer work across the entire spectrum and entire network redesign becomes necessary. What is needed is a network design capability to provide for all of the above needs simultaneously on a channel-by-channel or band-by-band basis. Such a solution should ideally also allow for network expansion with little or no disturbance to the existing network topology.

SUMMARY

The present invention solves the problems discussed above by providing intelligent, miniaturized, bandwidth-management modules (BMM's) which subdivide the wide available spectrum into narrow band segments. Each individual BMM is designed to overcome loss, optimize dispersion and provide power (or gain) equalization for a few channels at a time. Multiple BMM's can be concatenated together in an array (a bandwidth-management array or BMA) to provide a stepwise constant approximation to a broadband spectrum. Since amplification, dispersion compensation, and power equalization are all provided together for each set of channels, expanding a network to achieve greater bandwidth is easy, and relatively economical compared to prior art methods of network expansion. Additionally, networks built with the BMM's of the present invention exhibit better power equalization and dispersion characteristics than networks built using traditional components.

Throughout this disclosure, we refer to the selection of channels handled by an individual bandwidth-management module as a "band" of channels or wavelengths. We refer to the entire frequency range of channels handled by the network as the "spectrum" of channels or wavelengths. When we refer to "compensation" we are referring to at least dispersion compensation, but in some cases both dispersion compensation and power equalization. We sometimes refer to controlled gain. By controlled gain we usually mean power equalization (or gain equalization) according to any method disclosed herein, regardless of the degree or method of power equalization, and regardless of whether it is channel-by-channel or band-by-band, or over time for a group of channels. We use the term gain and amplification interchangeably. Finally, we refer to a collection of BMM's connected together with other components to manage the entire spectrum for a specific node within an optical network as a "bandwidth-management system," and we refer to the BMM's so connected as a "concatenated" bandwidth-management array (BMA).

According to the invention, a device is provided which exhibits controlled gain for a band of optical channels selected from a spectrum of optical channels in an optical network. The device includes an input block and an output block with an optical path in between. The input and output blocks include optical connectors and filters, as well as any other components necessary to direct the band of optical channels through the optical path while passing other optical channels within the spectrum to additional devices which can be connected without disturbing existing bandwidth-management modules. Each module also includes an amplifier connected in between the input and the output, and a compensation module that provides dispersion compensation specifically for the band of channels being handled by the device. The BMM further includes a digital control module which is programmed to monitor the average power in the band at the input and the output of the device. The control module can provide power or gain equalization by controlling one or more elements within the BMM. Power (or gain) equalization can be provided by controlling the laser current pumping the optical amplifier or by wavelength dependent loss elements such as attenuators and etalon cavities. In the preferred embodiment, dispersion compensation for the device is provided by a set of chirped optical fiber "Bragg" gratings connected to an optical circulator. The gratings can either be connected in series or in parallel. Gain equalization can also be provided by varying the channel-specific reflectivity of the gratings.

Bandwidth-management systems for an optical network can be easily assembled by making connections to one or more bandwidth-management arrays, each comprising a number of concatenated bandwidth-management modules. Such bandwidth-management systems can be used to form any part of the network through the inclusion of multiplexers and demultiplexers as necessary. The bandwidth-management systems can be used for transmitters, receivers, or as line amplifiers and repeaters. Each BMM within the BMS is responsible for a different band of channels selected from the spectrum of optical channels handled by the network. Preferably, a master controller is connected to the digital control modules for each of the BMM's to control the operation of the system. Crosstalk reduction within the optical network can be achieved by staggering the band selection from one BMA to another BMA so that adjacent bandwidth-management arrays group the same spectrum of channels into different bands of channels.

Each module of the invention is controlled by a digital control module which provides intelligence so that optimal characteristics are continuously maintained. The control module includes hardware to sample and compare the frequency dependent input power for the band of optical channels to which the module is dedicated, and sample and compare the frequency dependent output power for the same band. The pump laser power and current can also be monitored. The controller can continually adjust the module to keep an output property constant relative to the input power, a selectable fixed value, or a value provided by a master controller. In the preferred embodiment, it can also control the pump laser for constant power or constant drive current. We refer to the controller as "controlling" the module to provide controlled gain regardless of which components it is connected to within the module and how it is manipulating the components. It may provide controlled gain by controlling the amplifier, or by controlling loss elements, or a combination. The digital control module, the microcode which operates it, and the various amplifier, input, output, and compensation components all work together to provide the means to implement the modules of the invention.

BRIEF DESCRIPTION OF THE DRAWINGS

FIG. 6 is divided into FIGS. 6-A and 6-B for convenience.

DETAILED DESCRIPTION

Figure 5:
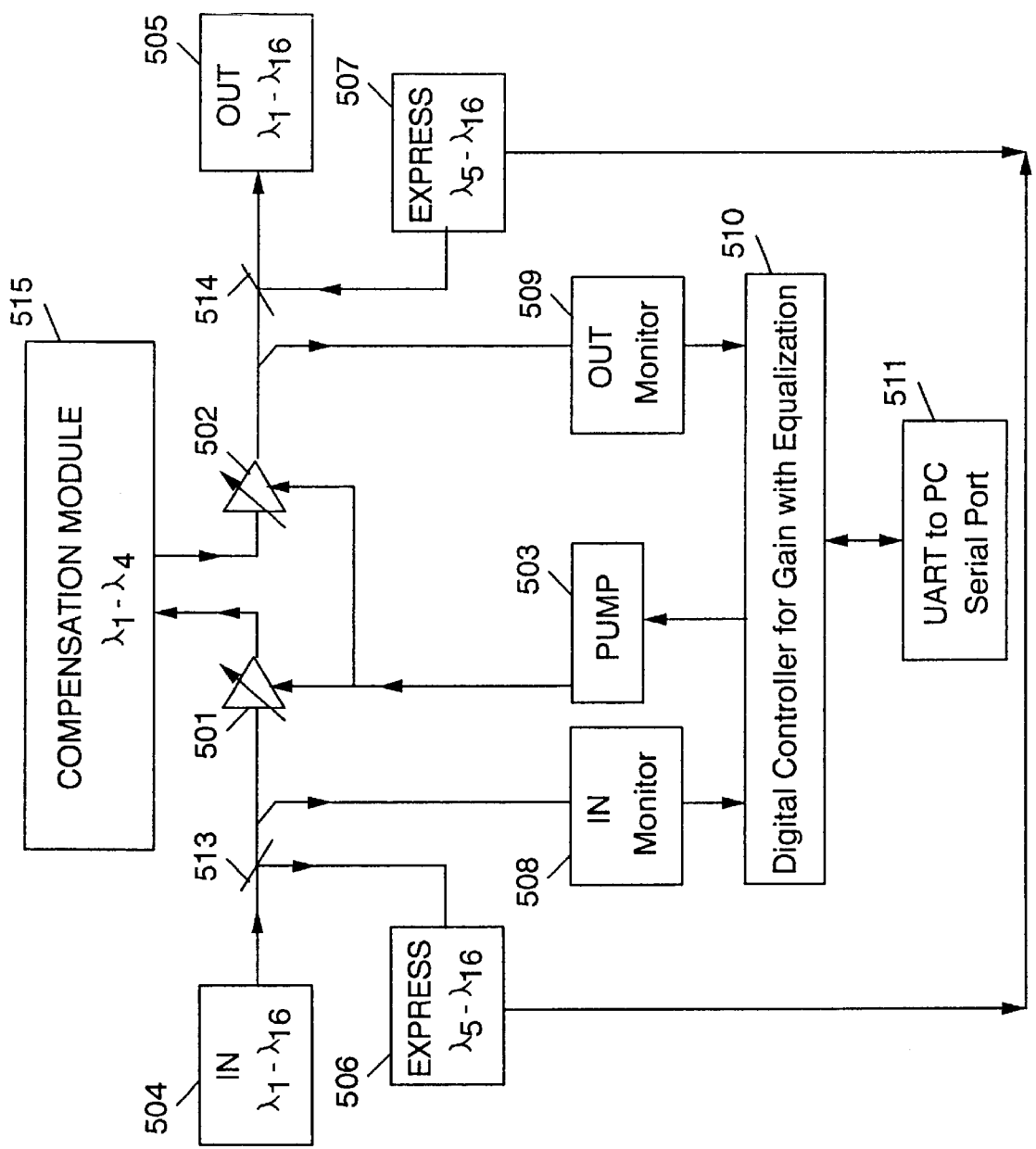
FIG. 5 is a functional block diagram of a bandwidth-management module according to the present invention.

FIG. 5 shows a block diagram of a bandwidth-management module (BMM) according to the present invention. Input connector 504 and input "express" connector 506 include connections for optical fibers. The input connector receives the entire spectrum of wavelengths or channels used in the network. We refer to the connectors which pass bands of channels other than those handled in this BMM to other BMM's as "express" connectors because they allow those wavelengths to be "expressed" around the BMM. Output connector 505 and output express connector 507 handle the output of a band of channels from the BMM. Dielectric thin-film filters, 513 at the input and 514 at the output, are integrated into the module to limit energy passing through the optical path of the BMM to the appropriate band. In the preferred embodiment, these filters include integrated optical isolators. The connectors, filters and isolators at the input form an input block, and the connectors and filters and isolators at the output form an output block. By way of example, the BMM shown in FIG. 5 is designed to provide its functions for a band of wavelengths, $\lambda_1$ through $\lambda_4$ from a spectrum of wavelengths $\lambda_1$ through $\lambda_{16}$. Wavelengths $\lambda_5$ through $\lambda_{16}$ are expressed to other modules.

The module also contains an erbium doped fiber amplifier (EDFA). In this embodiment, the amplifier includes two stages, 501 and 502, and a laser pump, 503. The amplifier also includes any required couplers, and as appropriate, a band dependent gain flattening filter, which is not shown in the drawing. The amplifier can include any number of stages, depending on the number of channels in the band and what gain equalization methods are used in the BMM. Each stage can be controlled by the same pump laser, or independent lasers can be provided.

In this example embodiment, each BMM includes a compensation module, 515 connected between the stages of the amplifier. The compensation module contains, at a minimum, dispersion compensation elements or means for connection to a dispersion compensating fiber. It can also contain power equalization elements. Various implementations of the compensation module are discussed below in reference to FIGS. 6–7 and 10–13. These implementations are examples only. The compensation module can provide dispersion compensation by any known means in addition to the means described in this application.

A digital control module is used to dynamically maintain EDFA functions. Multiple control modes can be provided to allow for power equalization across amplifier stages by individual control of pump laser current supplied. The digital control module or simply, "control module" includes digital controller 510, input monitor circuitry 508, output monitor circuitry 509, appropriate taps, and a universal a synchronous receiver and transmitter (UART), 511, to connect the controller to a computer for programming its functions. The controller subsystem may include other components such as filters. For example, a filter may be placed before the input to the output monitor circuitry 509 to limit the input to that circuitry to only the band of interest. Such a filter may improve performance since some energy at other frequencies may be present at the output of the amplifier. The UART is unused during normal operation in the field. If only one module is being used, the express connections of the module of FIG. 5 are simply connected together as shown at 512.

The controller described above can control the amplifier stages to provide enough differential gain adjustment, and hence, gain or power equalization, across the amplified band for some applications. Since pumping level of the laser for each stage affects the gain tilt of an EDFA, differential pumping of each following cascaded stage in the amplifier is required. While this type of power equalization alone provides less selective overall gain equalization, there are no multipath reflections, and fewer components are required in the BMM.

Preferably the controller of the present invention is programmed to operate in any of at least 5 different modes. We include any of these modes of operation within the term "controlled gain," whether the result is band-by-band equalization, channel-by-channel equalization, constant power, constant current, or some other type of gain control. In the first mode, called Constant Aggregate Optical Power Mode or Constant Output Power Mode, the optical output power out (total power of all channels) of stage 2 of the amplifier is monitored and compared to a selectable fixed reference level, and regulated to that fixed level. When the monitor level falls, the pump current drive level is increased, which increases the optical pump power level, which increases the gain in the erbium-doped fiber, which in turn increases the optical output power level. When the monitor level rises, the pump current drive level is decreased, which decreases the optical pump power level, which decreases the gain in the erbium-doped fiber, which in turn decreases the optical output power level. When the correction is sufficient, the pump current drive level is held constant, holding the optical pump power level and erbium gain constant, which then holds the optical output power level constant. This method regulates out small and large changes to the input optical power and hence does not detect dropped or added channels.

The second mode is called Constant Channel Optical Power Mode or Constant Gain Mode. With this mode, the optical output power out of stage 2 is monitored and compared to a selectable variable reference level, and regulated to that level. The variable reference level is proportional to the input optical power level. The input optical power level is monitored by the controller through the input tap and input monitor 508 of FIG. 5. When a channel is dropped, the input level falls proportional to the number of channels and the output monitor level falls as well. The pump current drive level is decreased, which decreases the optical pump power level, which decreases the gain in the erbium-doped fiber, which in turn decreases the optical output power level to exactly match the decrease in the input optical power level. When a channel is added, the input level rises proportional to the number of channels and the output monitor level rises as well. The pump current drive level is increased, which increases the optical pump power level, which increases the gain in the erbium-doped fiber, which in turn increases the optical output power level to exactly match the increase in the input optical power level. When the correction is sufficient, the pump current drive level is held constant, holding the optical pump power level and erbium gain constant, which then holds the optical output power level constant at the same proportionality ratio to the input optical power level. This method regulates out large changes to the input optical power by automatically detecting dropped or added channels by the change in input power level. However for small changes in optical input power level for a constant number of channels, the small changes will be proportionally passed on to the output power level in each channel.

The third mode is called Constant Channel Optical Power Mode via a hybrid Constant Output Power Mode. In this mode the master controller detects the number of active channels within the band. It then directs the EDFA's microcontroller to set the selectable fixed reference operating point proportional to the number of active channels. The unit then operates in the constant aggregate optical power mode as described above. This method regulates out large changes to the input optical power due to dropped or added channels by detecting the number of active channels and changing the fixed reference power level. This method also regulates out small and large changes to the input optical power for a fixed number of channels by holding the aggregate and hence per channel power constant.

In the fourth mode, the Constant Pump Power Mode, use is made of a back face monitor diode which is incorporated into the laser pump. The laser's back face monitor diode produces a current proportional to the optical pump power out of the laser. This current is monitored and compared to a selectable fixed reference level, and regulated to that fixed level. When the monitor level falls, the pump current drive level is increased, which increases the optical pump power level. When the monitor level rises, the pump current drive level is decreased, which decreases the optical pump power level. When the correction is sufficient, the pump current drive level is held constant, holding the optical pump power level constant. This method is a standard EDFA operation mode, which relies on the erbium saturation curve to regulate the optical output power. For large optical input power levels, the output approaches a constant power level. For small optical input power levels, the amplifier approaches a constant gain level. This method has the advantage of averaging out the variations in the pump laser light-current curve.

A fifth operating mode is the Constant Pump Current Mode. In this mode, the laser's drive current is monitored and compared to a selectable fixed reference level, and regulated to that fixed level. When the monitor level falls, the pump current drive level is increased. When the monitor level rises, the pump current drive level is decreased. When the correction is sufficient, the pump current drive level is held constant. This method is an equivalent standard EDFA operation mode, which relies on the erbium saturation curve to regulate the optical output power. For large optical input power levels, the output approaches a constant power level. For small optical input power levels, the amplifier approaches a constant gain level. This method has the advantage of averaging out the changes in the pump laser power to back face monitor tracking ratio.

Figure 6A:
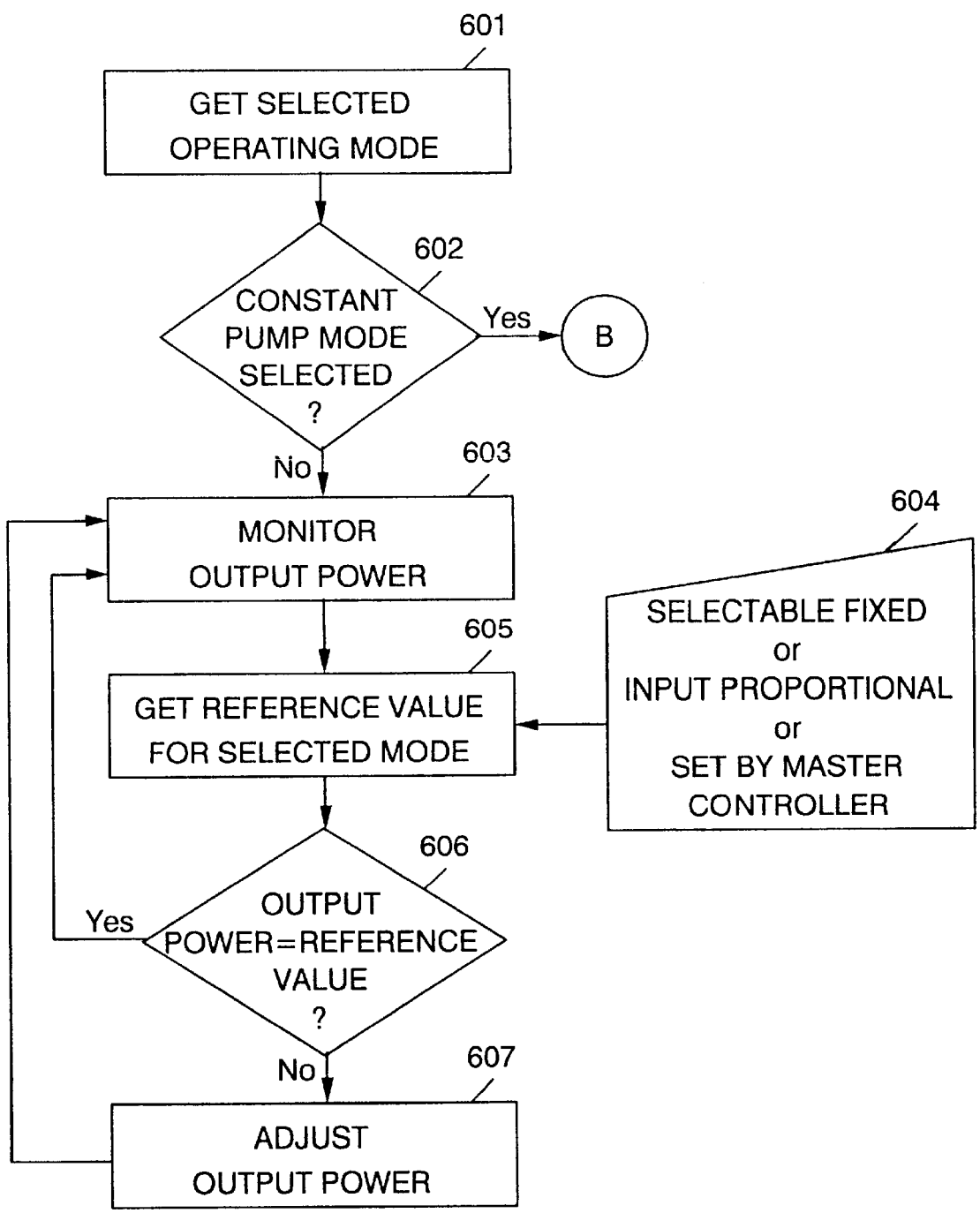
FIG. 6 is a flowchart which illustrates the method of controlling an bandwidth-management module of the present invention.
Figure 6B:
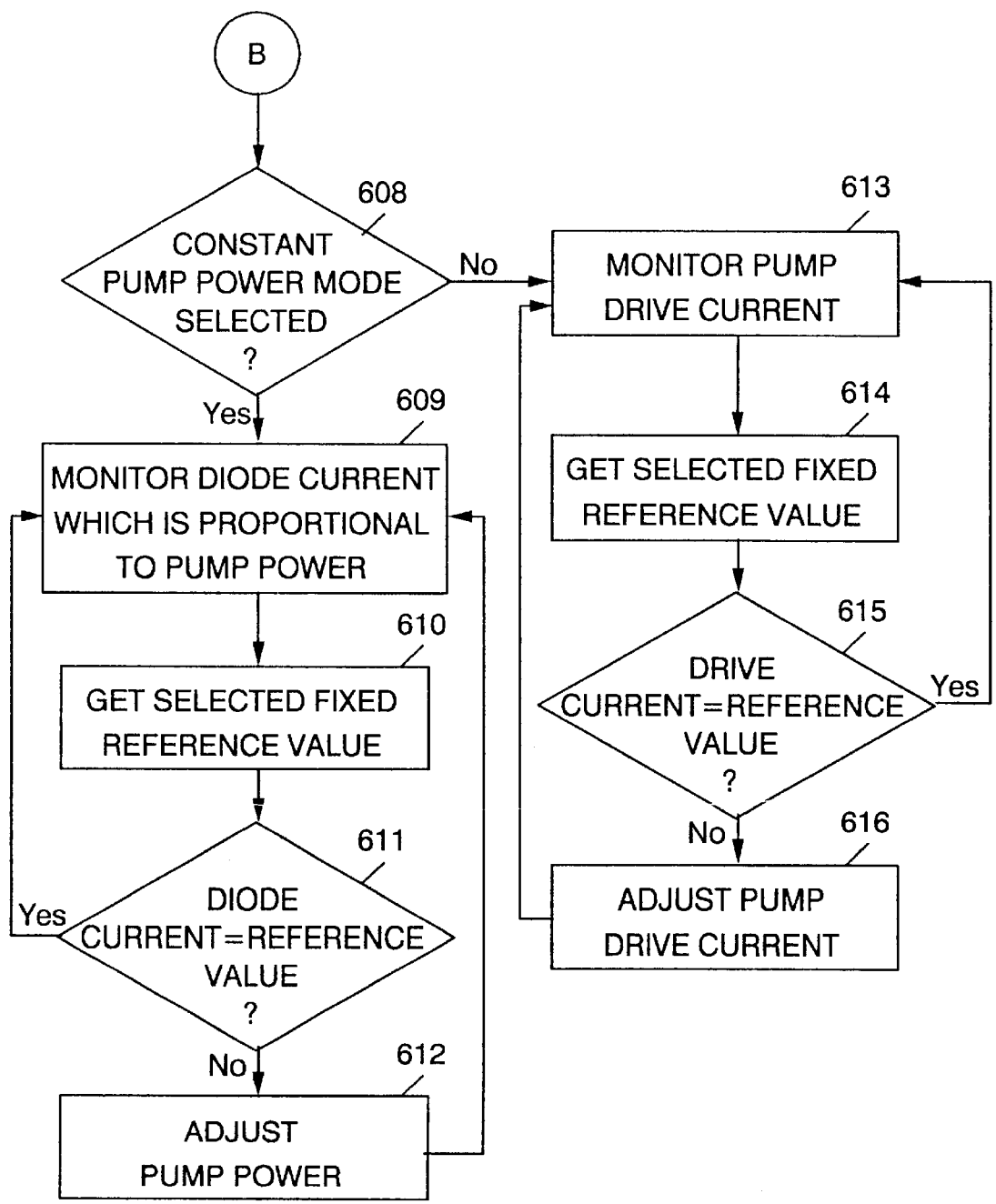

A high-level conceptual flow diagram of controller operation is shown in FIG. 6. FIG. 6 is divided into parts A and B for convenience. At 601 the selected operating mode is determined. This mode is preferably programmed into the controller during setup through the UART interface. For example, each mode may set a specific value in a register. If the selected mode is one of the two "constant pump" modes described above, the process branches to part B at 602. The other modes require that output power be monitored and the monitoring is initiated at 603. At 605 the first reference value is fetched. Depending on the mode, this is determined either from the input monitor or master controller, or it can be a selectable fixed value. The appropriate reference value is input to the process at 604. At 606 the output value is compared to the reference value, if they match, a new reference value is fetched at 605 and the process repeats. The reference value will have only changed if it is input proportional or set by the master controller. The controller can be programmed to simply recompare and not fetch a new value if one of the selectable fixed values is chosen. If the comparison at 606 shows the values don't match, the output power is adjusted at 607.

Part B of FIG. 6 shows the process if a constant pump mode is selected. If the constant pump power mode has been selected the process is directed at step 608 to step 609, where the monitoring of the diode current is initiated. This monitoring continues. At 610, the fixed reference value is fetched. The two are compared at 611. If they compare favorably, the process loops. If an adjustment is required it is made at 612. The constant pump drive current process beginning at 613 is similar. A selected, fixed reference value is fetched at 614, once the monitoring is initiated at 613. The two are compared at 615, and adjustments are made as necessary at 616.

Figure 7:
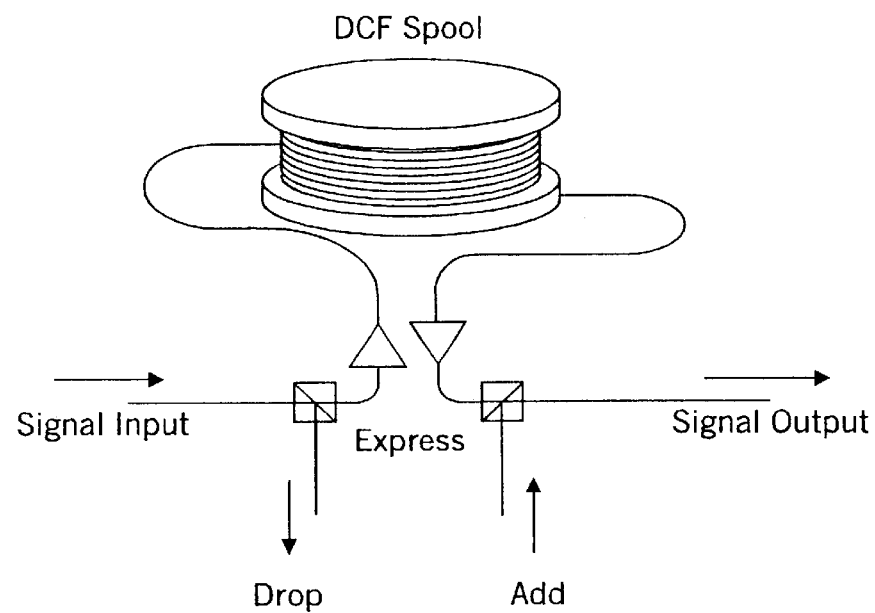
FIG. 7 illustrates the providing of dispersion compensation for the bandwidth-management module of the present invention with dispersion compensating fiber.

A standard dispersion compensation method is to use dispersion compensating fiber (DCF) modules to provide approximately 1000 ps/nm with 20–60 km dispersion compensating fiber spools. The dispersion compensation of the compensation module for the BMM of the invention can consist of connections for commercially available modules. Suitable modules typically measure approximately 10×10×2 inches, small enough to be conveniently packaged external to, but near the BMM's. FIG. 7 shows such a module connected to the BMM of the present invention.

Figure 8:
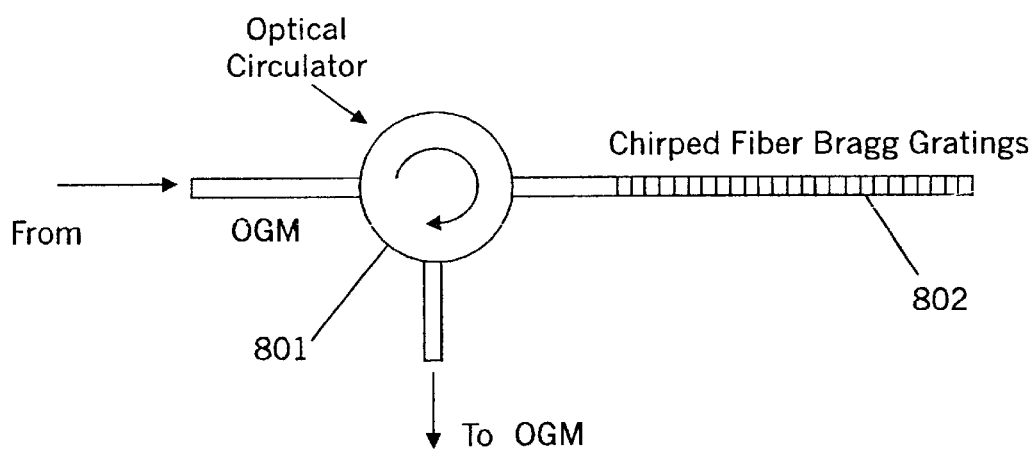
FIG. 8 illustrates a dispersion compensation module design within the bandwidth-management module of the present invention.

A better alternative for a fixed dispersion solution is to use linearly-chirped fiber Bragg gratings. Chirped grating compensators have high figures of merit (FOM, about 1500 ps/nm-dB). Chirped gratings have typically not been used in broadband systems because the required length of the gratings makes it impractical to use them for Δλ~40 nm. However, the narrow bandwidth requirements of the individual BMM's of the invention make chirped gratings the dispersion compensator of choice in this application. FIG. 8 illustrates a chirped fiber Bragg grating compensator. Gratings 802 are connected serially and in turn connected to optical circulator 801. The optical circulator is connected to the amplifier of the bandwidth-management module. A small grating package is incorporated directly into the BMM package as a circuit board. Various aspects of the fabrication and use of chirped fiber Bragg gratings are described in U.S. Pat. No. 5,420,948, issued May 30, 1995; U.S. Pat. No. 5,602,949, issued Feb. 11, 1997; and U.S. Pat. No. 5,718,738, issued Feb. 17, 1998; all of which are incorporated herein by reference.

As previously discussed, the amplifier can be dynamically controlled to provide some power equalization. However, more accurate, channel-by-channel equalization can be achieved through the use of additional equalization mechanisms. One such mechanism is the inclusion of dynamic gain-ripple adjustment components in the BMM. It is well known that cavity effects in optical amplifiers can produce gain ripple. in the optical spectrum due to constructive and destructive interference of wavelengths in the gain spectrum. The frequency of the ripple, Δν, is given by the equation:

$$\Delta v = \frac{c}{2nL},$$

where c is the speed of light in vacuum, n is the refractive index in the cavity, and L is the cavity length. An air-filled cavity, 1.5 mm in length, will produce gain ripple of 100 GHz; a glass-filled cavity 1 mm in length will also produce this ripple. The depth of the ripple will be dependent on the reflectivities of the surfaces defining the cavity.

Figure 9:
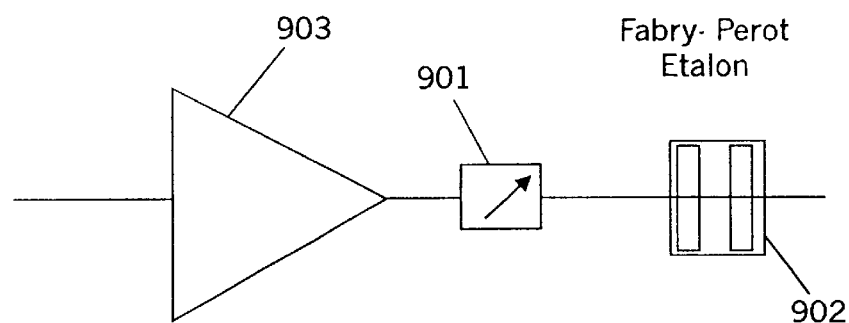
FIG. 9 illustrates one way of using a cavity to provide power (or gain) equalization with the present invention.
Figure 10:
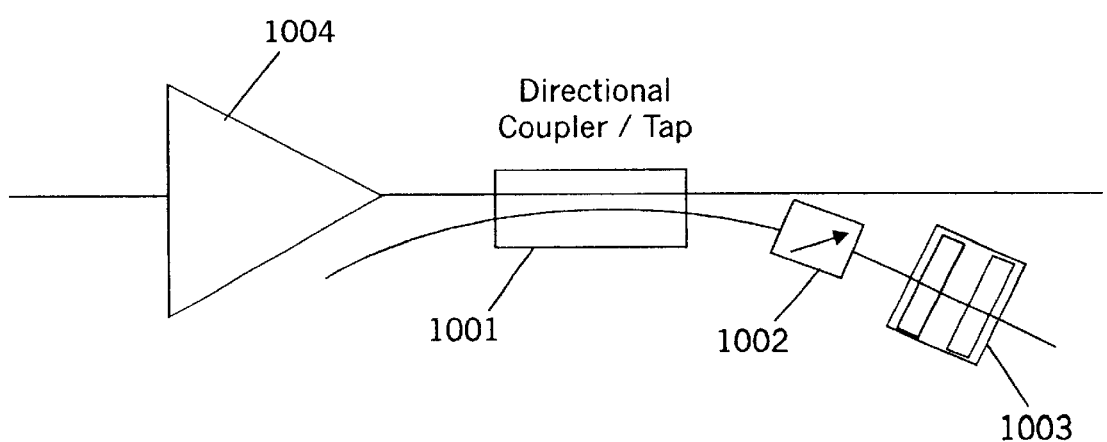
FIG. 10 illustrates another way of using a cavity to provide power (or gain) equalization with the present invention.

FIGS. 9 and 10 how such a cavity, called a Fabry-Perot etalon, 902 in FIG. 9 and 1003 in FIG. 10, is connected at the output of the EDFA of the present invention to produce a wavelength-dependent feedback. This feedback, combined with scattering in the erbium-doped fiber, produces gain ripple. By tailoring the amount of feedback and the cavity spacing of the etalon, the gain ripple is controllable. FIG. 9 shows one geometry for the system. In FIG. 9, etalon, 902 is placed directly in the output path of the amplifier 903. It should be noted that this cavity could be placed in the output path of the compensation module of the BMM as well. Variable attenuator 901 controls the amount of feedback. The controller of the BMM controls the variable attenuator. In FIG. 10, a directional coupler, 1001, is used to isolate the etalon, 1003, from the output path of BMM amplifier 1004; in this case larger losses in the feedback loop may be tolerated. Again, a variable attenuator, 1002, is placed before the etalon to provide dynamic adjustment of the feedback.

The period of the ripple may be adjusted by changing either, or both, of the two variables the equation above. For example, an air-filled, fiber Fabry-Perot cavity with spacing adjusted via piezo-electric element may be employed to change cavity length L. Also, a liquid-crystal-filled cavity can be used, with refractive index adjustment through an applied voltage, controlled by the controller. It may be desirable to enhance the reflection resulting from scattering in the erbium, with a second cavity placed at the input to the gain medium.

If multiple cavities are cascaded, each having an adjustable period, phase, and ripple, a designer can synthesize more complicated ripple (or loss) functions, in a manner analogous to Fourier decomposition. A set of etalons of different cavity lengths and/or refractive indices may be used to produce a set of frequencies in the ripple spectrum that, with proper weighting (i.e., feedback), produce a non-sinusoidal ripple function in the spectral region of interest. This concept may be extended to produce a wavelength-dependent loss element for application in the grating-based designs described next. As with the single cavity above, multi-path reflections must be dealt with.

As discussed in reference to FIG. 8, linearly chirped fiber Bragg gratings (FBG's) are used as dispersion compensating elements in the compensation module. In the geometry previously discussed, the gratings are cascaded in series, with a circulator used at the grating input to redirect the reflected, compensated signals to the second gain stage of the BMM amplifier. If the insertion loss for all channels is equal, then no adjustment of a single-channel's gain can be made in this configuration. However, if variable attenuators are connected between the gratings or the reflectivity of the gratings is varied, adjustment of single-channel gain (via variable insertion loss) can be obtained. In the former case (attenuators), the gain may be dynamically adjusted, while the latter case (reflectivity) represents a fixed solution with the usual fixed grating types.

Figure 11:
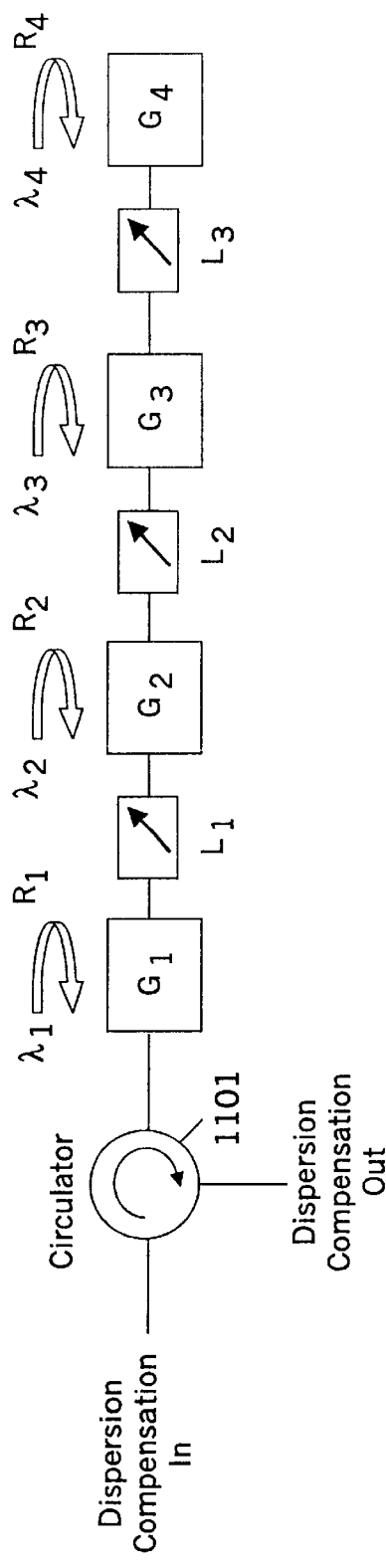
FIG. 11 illustrates a compensation module of the present invention which provides both dispersion compensation and power equalization.
Figure 12:
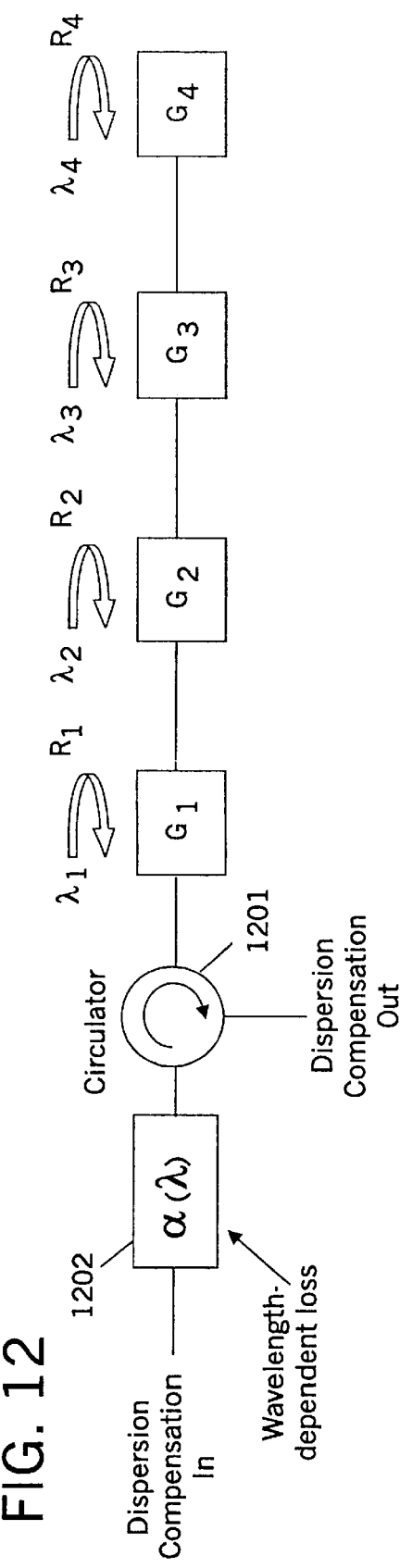
FIG. 12 illustrates another compensation module of the present invention which provides both dispersion compensation and power equalization.

FIG. 11 illustrates series FBG's with attenuators in between. The attenuators, L, are controlled by the controller in the BMM. The input signal to the dispersion compensation module is transferred through the circulator, 1101, and is incident on grating $G_1$ which compensates for wavelength $\lambda_1$ and reflects this channel with reflectivity $R_1$. The remaining channels are transmitted through the first variable attenuator with single-pass loss $L_1$, and the process is repeated for subsequent channels ($\lambda_2$, $\lambda_3$, $\lambda_4$) with reflections from their respective dispersion-compensating gratings ($G_2$, $G_3$, $G_4$). If we assume reflectivities and losses expressed in logarithmic units (e.g., decibels), then the relationships for the insertion losses of the four channels are:

$IL(\lambda_1)=R_1$
$IL(\lambda_2)=2L_1=R_2$
$IL(\lambda_3)=2L_1+2L_2+R_3$
$IL(\lambda_4)=2L_1+2L_2+2L_3+R_4$ Thus, the relative insertion losses for the four channels may be dynamically adjusted with the attenuators, or may be fixed for a specific system by adjusting the grating reflectivities in the absence of attenuators. A disadvantage of this technique is that the positional order of the gratings influences the possibility of adjustment for a particular signal channel.

A variation of the above concept is the use of a wavelength-dependent attenuation rather than discrete adjustable attenuators. This concept is pictured in FIG. 12, where wavelength dependent loss element 1202 is connected to circulator 1201. Here, a component with attenuation (in dB) of $\alpha(\lambda)$ is placed in the common path, i.e.-before the gratings. The component may be placed either before the circulator input as shown, at the circulator output, or between the circulator and gratings. (The total loss will be 2 * α(λ) in the latter case.) In this arrangement, the individual insertion losses are given by:

$$IL(\lambda_{-1})=\alpha(\lambda_{-1})+R_1$$
$$IL(\lambda_{-2})=\alpha(\lambda_{-2})+R_2$$
$$IL(\lambda_{-3})=\alpha(\lambda_{-3})+R_3$$
$$IL(\lambda_{-4})=\alpha(\lambda_{-4})+R_4$$

The wavelength-dependent loss may be generated in a fixed geometry such as a filter (thin-film, long-periodic grating) or with a dynamically-variable component such as a flexural acoustic-wave filter. Alternatively, multiple etalon cavities, as described above, can be used. An advantage of this design is that broadband gratings spanning multiple channels may be employed.

Figure 13:
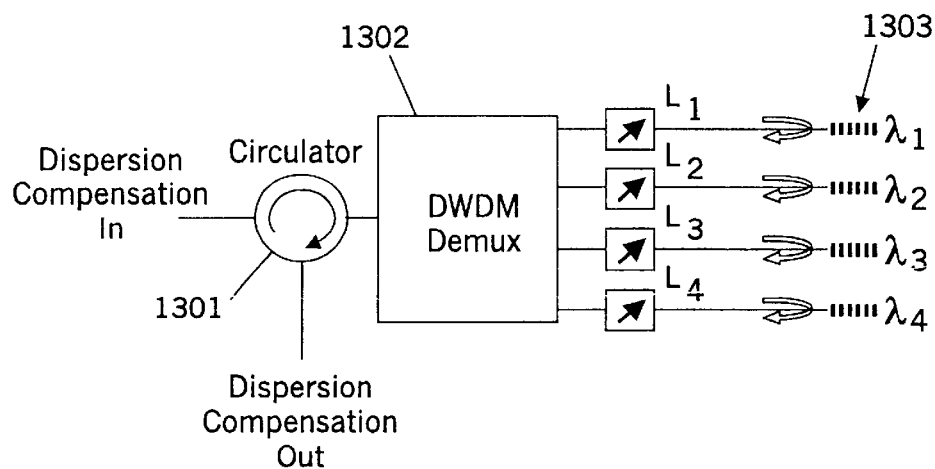
FIG. 13 illustrates another compensation module of the present invention which provides both dispersion compensation and power equalization.
Figure 14:
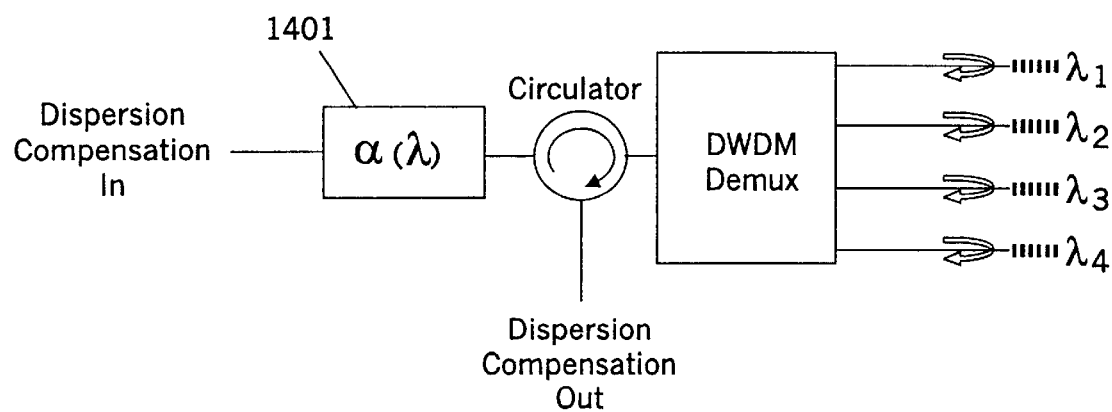
FIG. 14 illustrates another compensation module of the present invention which provides both dispersion compensation and power equalization.

A third design for the compensation module is pictured in FIG. 13. Here, the signal from the circulator, 1301, is demultiplexed by a DWDM demultiplexer, 1302, into four separate channel paths. Variable attenuators, L, in each path are used to dynamically adjust the insertion loss for the individual channels. Although this geometry introduces the additional cost of a demultiplexer, it reduces the risk of multipath interference. In addition, the order of the gratings, 1303 is irrelevant here, unlike the geometry of FIGS. 11 and 12 where insertion loss generally increases for gratings farthest from the circulator. FIG. 14 shows an extension of this idea, to replace the independent attenuators with a single, wavelength-dependent attenuator, 1401, in the common path, similar to that illustrated in the FIG. 12 above.

Figure 15:
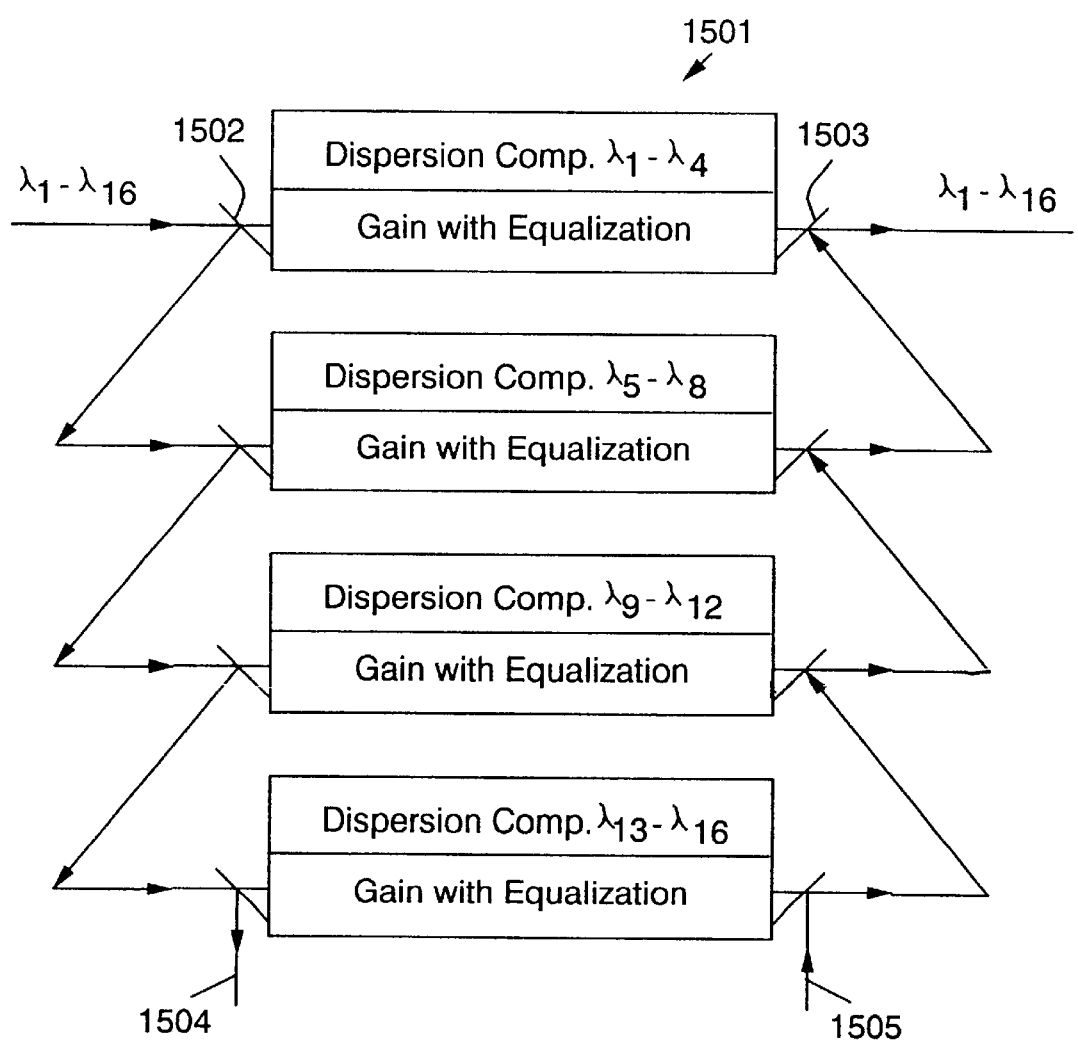
FIG. 15 illustrates a bandwidth-management array of the present invention connected to an optical network as a repeater or line amplifier.
Figure 16:
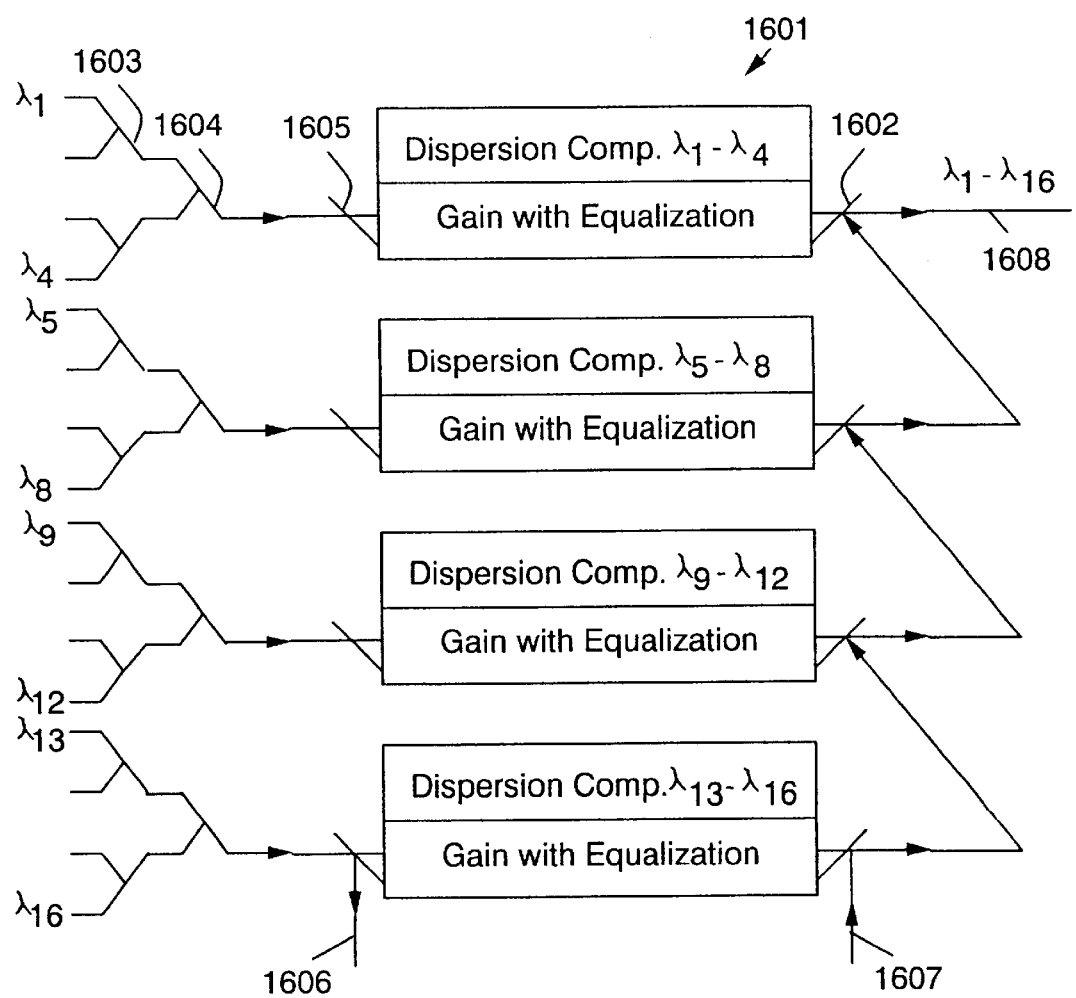
FIG. 16 illustrates a bandwidth-management array of the present invention connected to an optical network as a transmitter.
Figure 17:
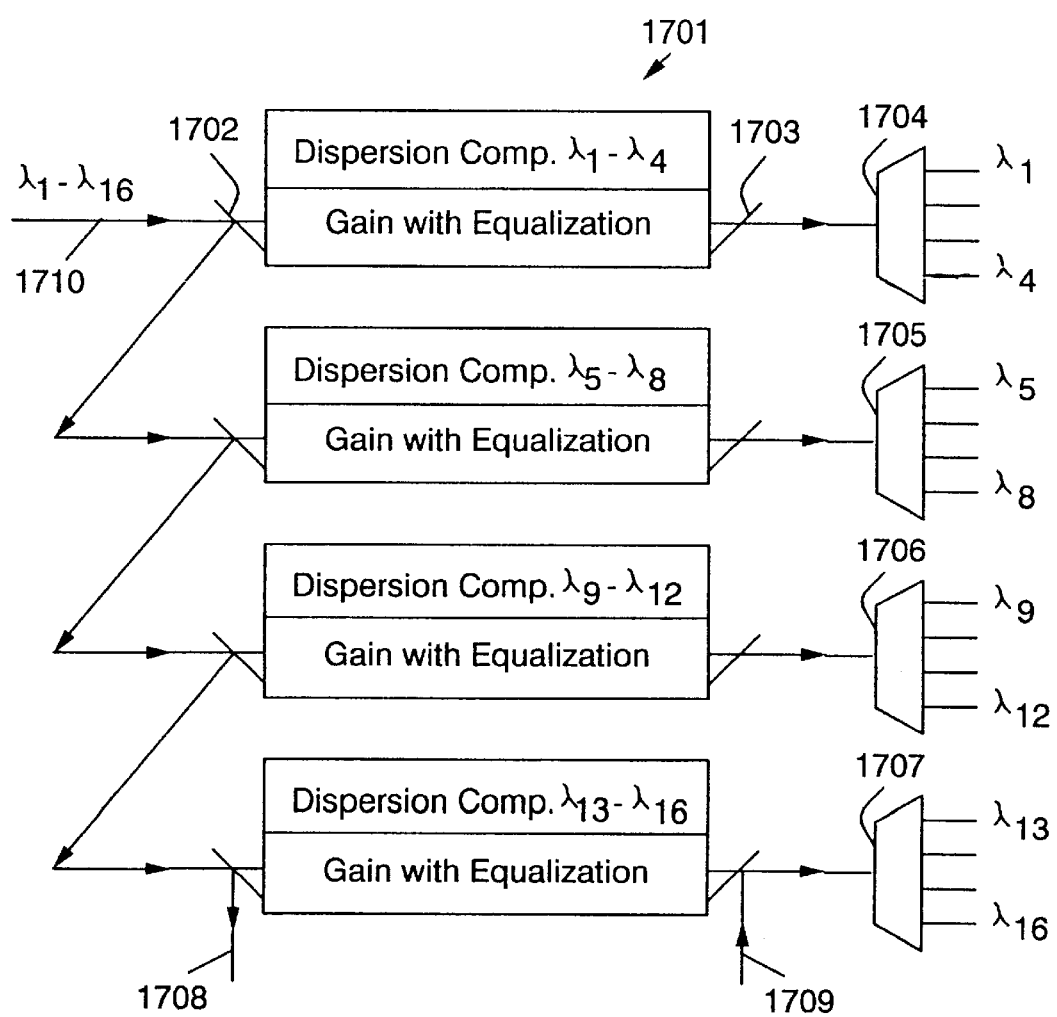
FIG. 17 illustrates a bandwidth-management array of the present invention connected to an optical network as a receiver.

FIGS. 15, 16 and 17 illustrate network subsystems, which we call bandwidth-management systems, each of which makes use of a plurality of BMM's concatenated together into a bandwidth-management array (BMA), where each BMM handles a different band out of the network spectrum. FIG. 15 shows a drawing of a subsystem comprised of 4-concatenated BMM's, 1501. This bandwidth-management system can be used as a line amplifier or repeater. A parallel arrangement provides a "pay-as-you-grow" architecture where modules can be added without disturbing existing traffic. Each BMM is tailored in accordance with the different transmission requirements of the band of channels it handles. For example, the input and output filters of each BMM, as shown at 1502 and 1503, respectively, direct the appropriate channels through the BMM. The subsystem has a master digital controller to monitor functions (not shown), and be a taskmaster for controllers of the individual BMM's. Additional BMM's can be added at express connections 1504 and 1505.

FIGS. 16 and 17 show subsystems like that discussed immediately above, only in these cases they are combined with multiplexers to provide DWDM terminals. In FIG. 16, BMM's as shown at 1601, filters, as shown at 1602 and 1605, and express connections 1606 and 1607 function as before. However, 2-to-1 multiplexers, as shown at 1603 and 1604, are arranged as shown at the input to the BMA to create a transmit terminal. Wavelengths $\lambda_1$ through $\lambda_4$ form the band handled by the first BMM. Wavelengths $\lambda_5$ through $\lambda_8$ form the band handled by the second BMM. Wavelengths $\lambda_9$ through $\lambda_{12}$ from the band handled by the third BMM, and wavelengths $\lambda_{13}$ through $\lambda_{16}$ are handled by the last (bottom) BMM shown in the drawing. The entire spectrum, $\lambda_1$ through $\lambda_{16}$, is then transmitted out over the network at 1608.

FIG. 17 is similar in the arrangement of BMM's as shown at 1701, wherein the bandwidth-management array operates as a receiver. Filters within the modules, like that shown at 1702 and 1703 work as before, and express connections are again provided at 1708 and 1709. The entire spectrum for the network, $\lambda_1$ through $\lambda_{16}$, is received at 1710. 1-to-4 demultiplexer 1704 breaks out wavelengths $\lambda_1$ through $\lambda_4$ which are within the band handled by the first BMM. Demultiplexer 1705 breaks out wavelengths $\lambda_5$ through $\lambda_8$ which form the band handled by the second BMM. Demultiplexer 1706 breaks out the next band, wavelengths $\lambda_9$ through $\lambda_{12}$. Finally, demultiplexer 1707 handles the last band in the spectrum, consisting of wavelengths $\lambda 13$ through $\lambda_{16}$.

The above bandwidth management subsystem configurations are shown as examples only. There is literally an infinite number of subsystem designs available through the use of the invention.

Figure 18:
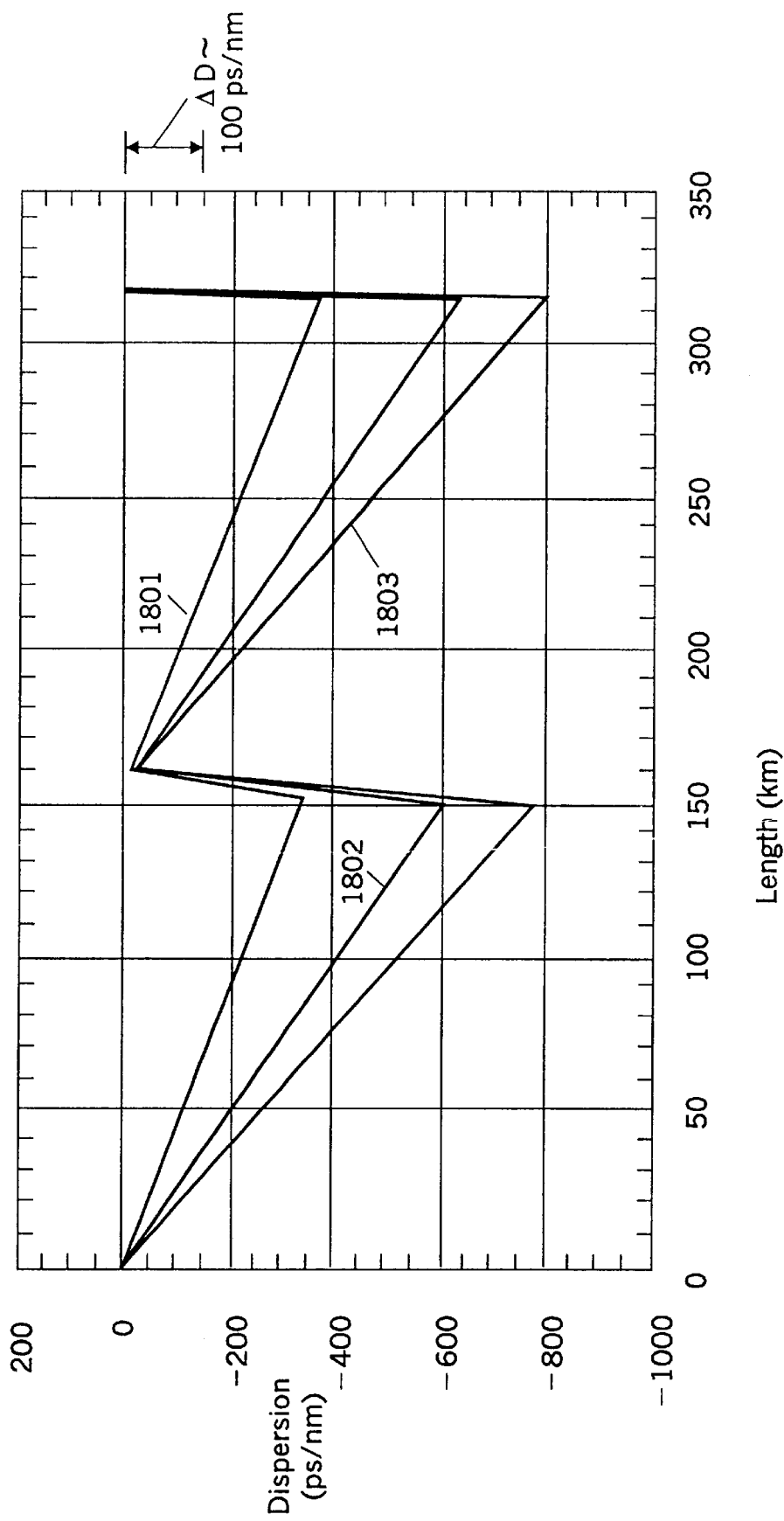
FIG. 18 is a dispersion map for an optical network using the invention.

FIG. 18 shows a dispersion map of a typical network segment, which makes use of the invention. Note that, in addition to the flexibility of network design our invention provides, dispersion compensation is greatly improved. The map of FIG. 18 shows curves, 1801, 1802, and 1803 corresponding to the same three respective bands as discussed in reference to FIGS. 1 and 2—1553 to 1559 nanometers; 1540 through 1543 nanometers; and 1531 to 1533 nanometers. BMM's according to the invention are included in the network roughly every 150 kilometers. Accumulated dispersion here, ΔD is approximately 100 ps/nm.

Figure 1:
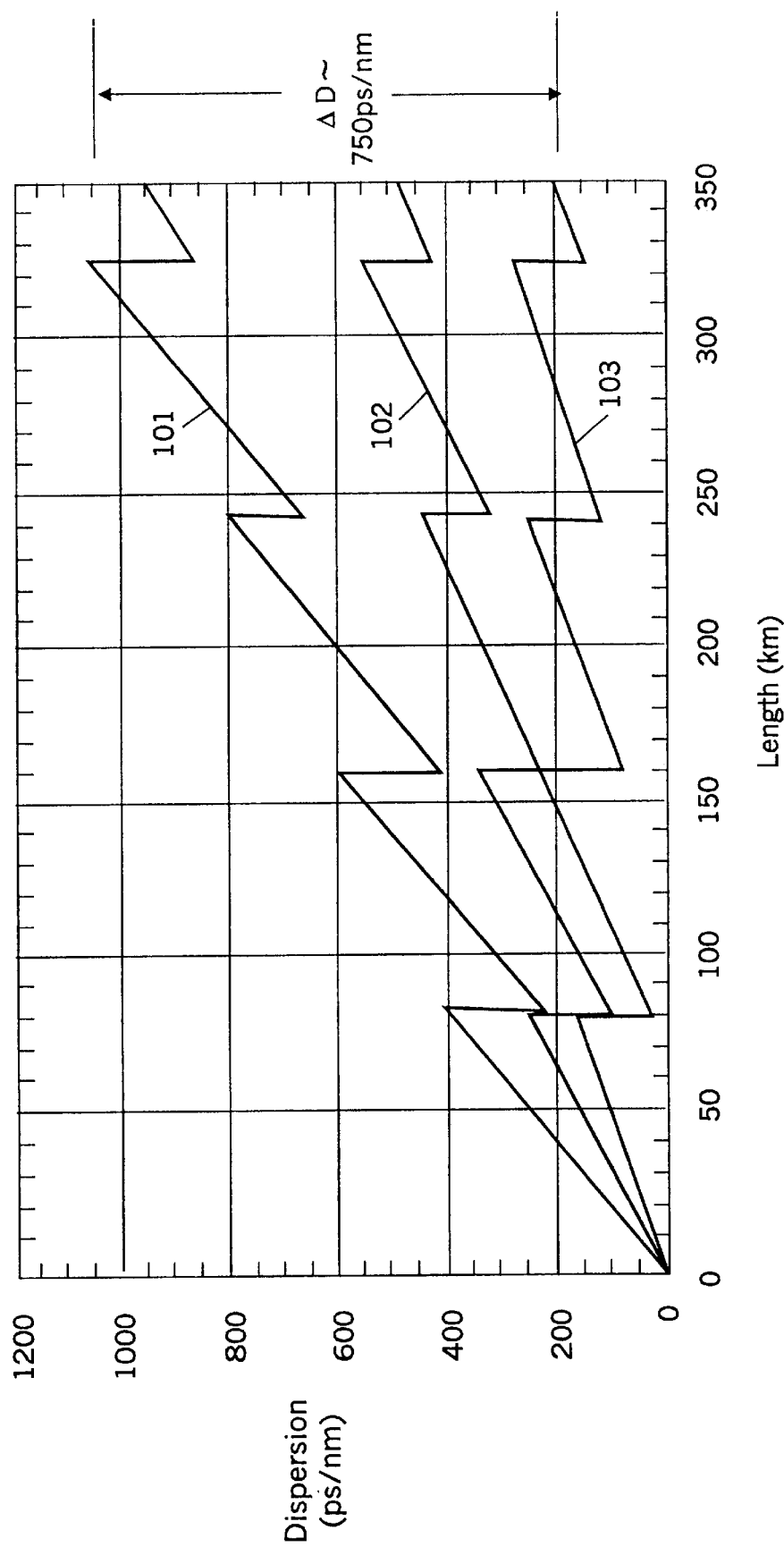
FIG. 1 illustrates an optical dispersion map for a terrestrial optical network of the prior art.
Figure 2:
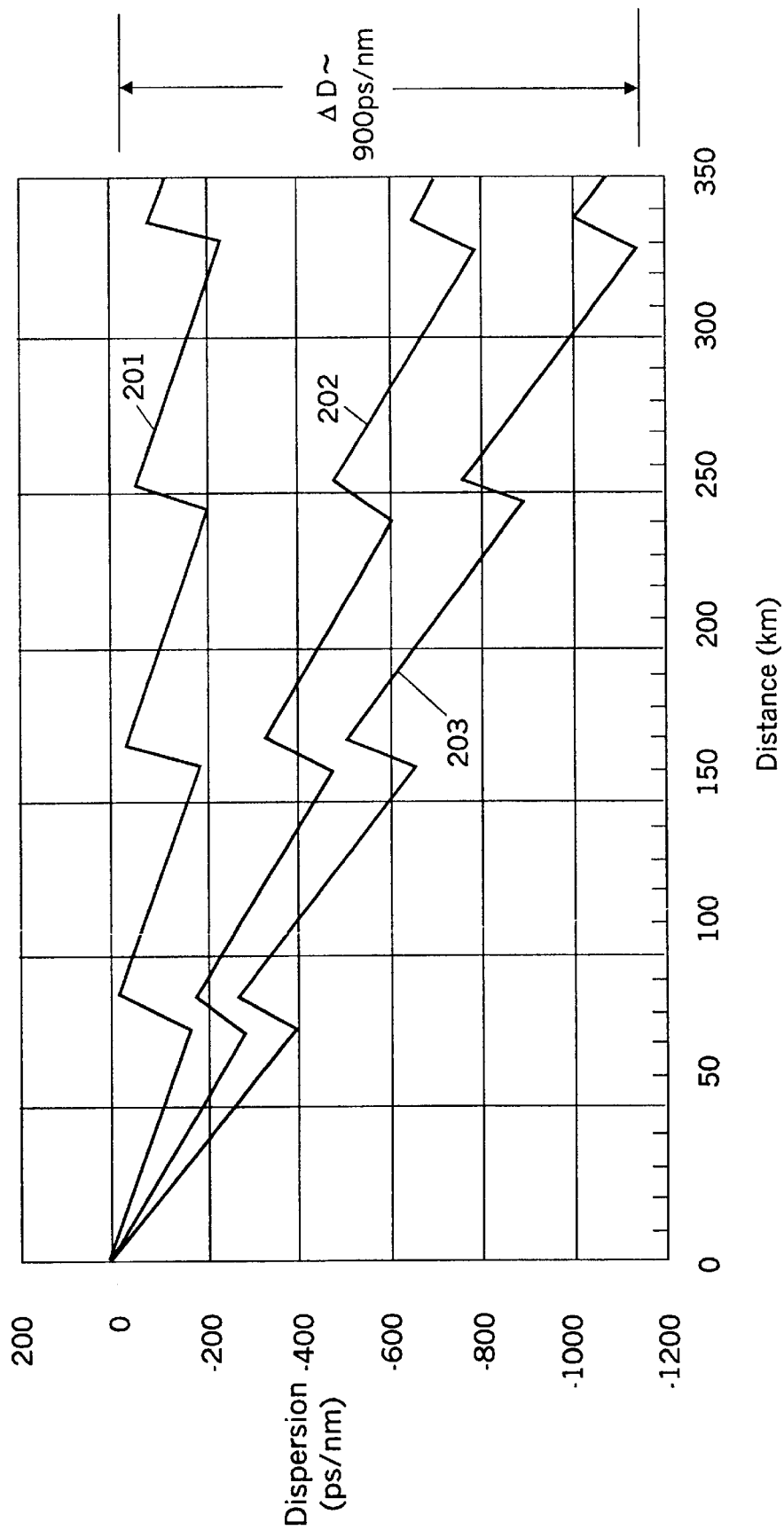
FIG. 2 illustrates an optical dispersion map for a submarine optical network of the prior art.
Figure 3:
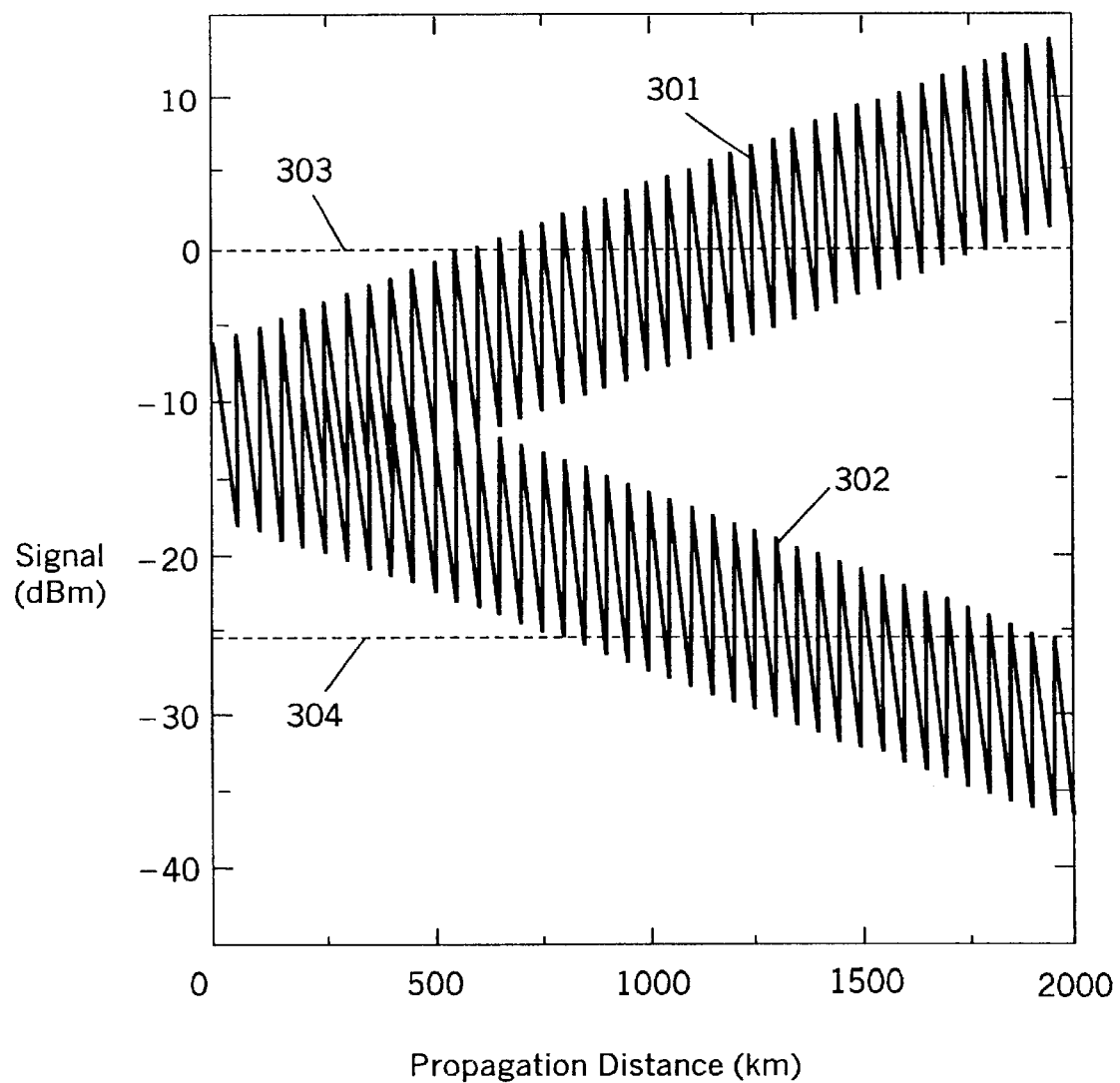
FIG. 3 illustrates the power equalization problem in a submarine optical network of the prior art.
Figure 4:
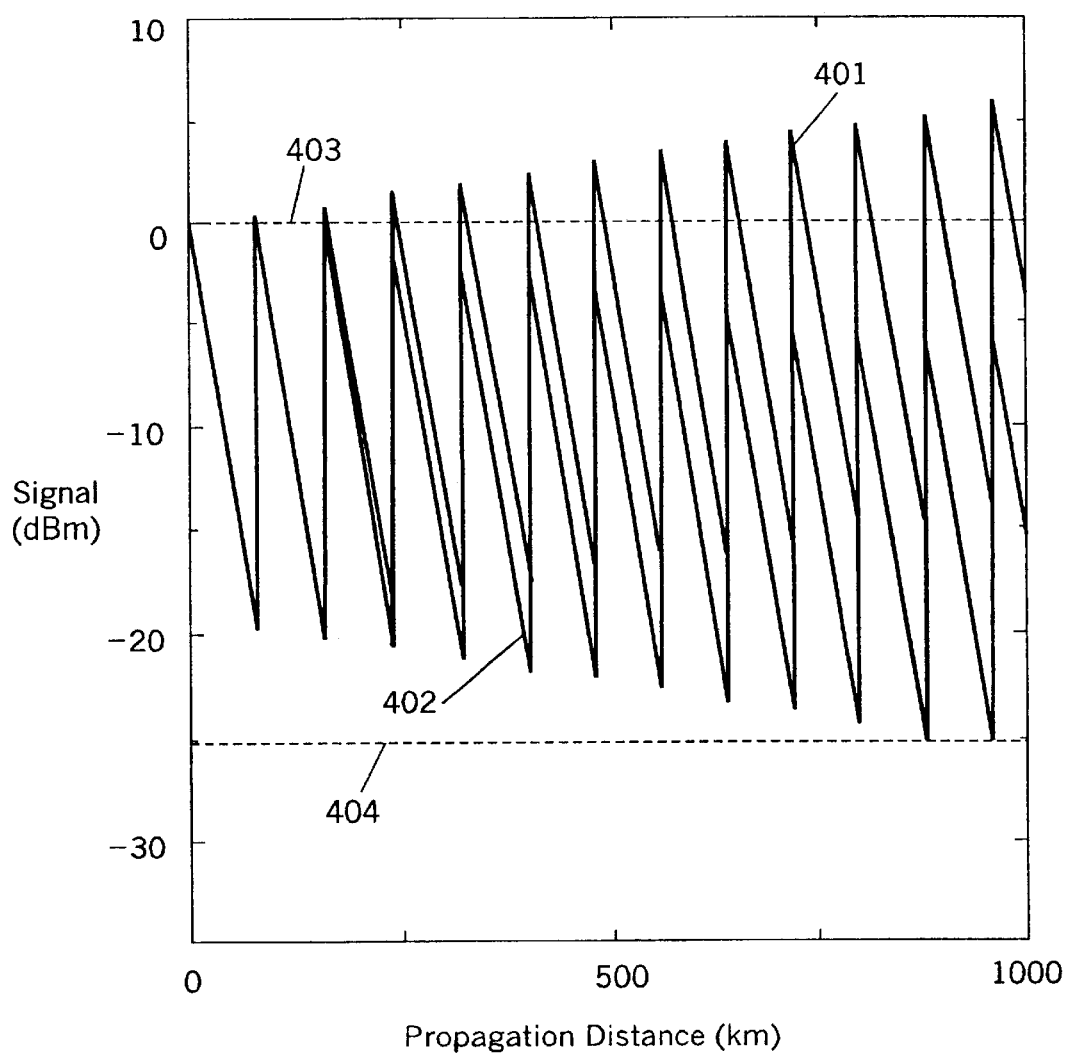
FIG. 4 illustrates the power equalization problem for a terrestrial optical network of the prior art.
Figure 19:
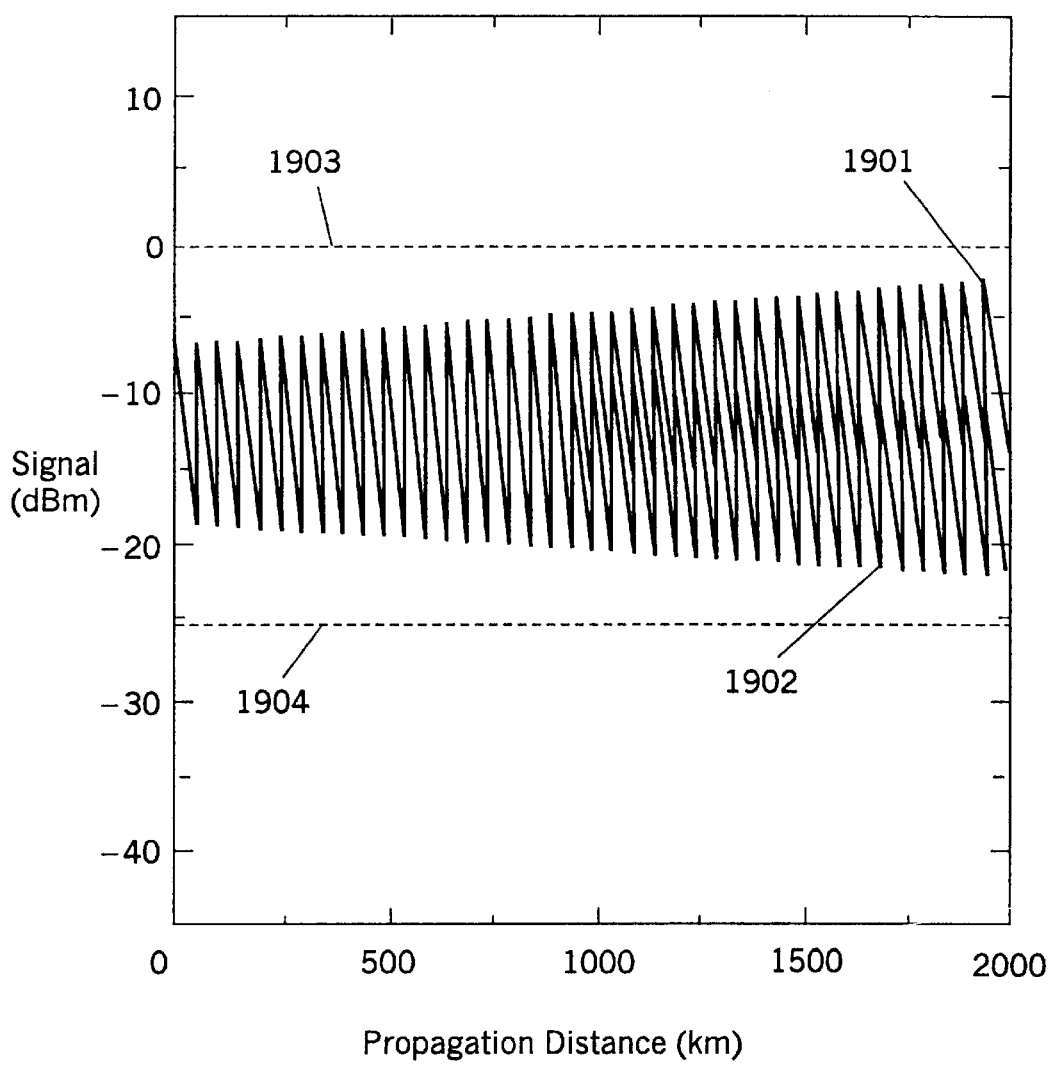
FIG. 19 illustrates power equalization for one type of network which employs the present invention.
Figure 20:
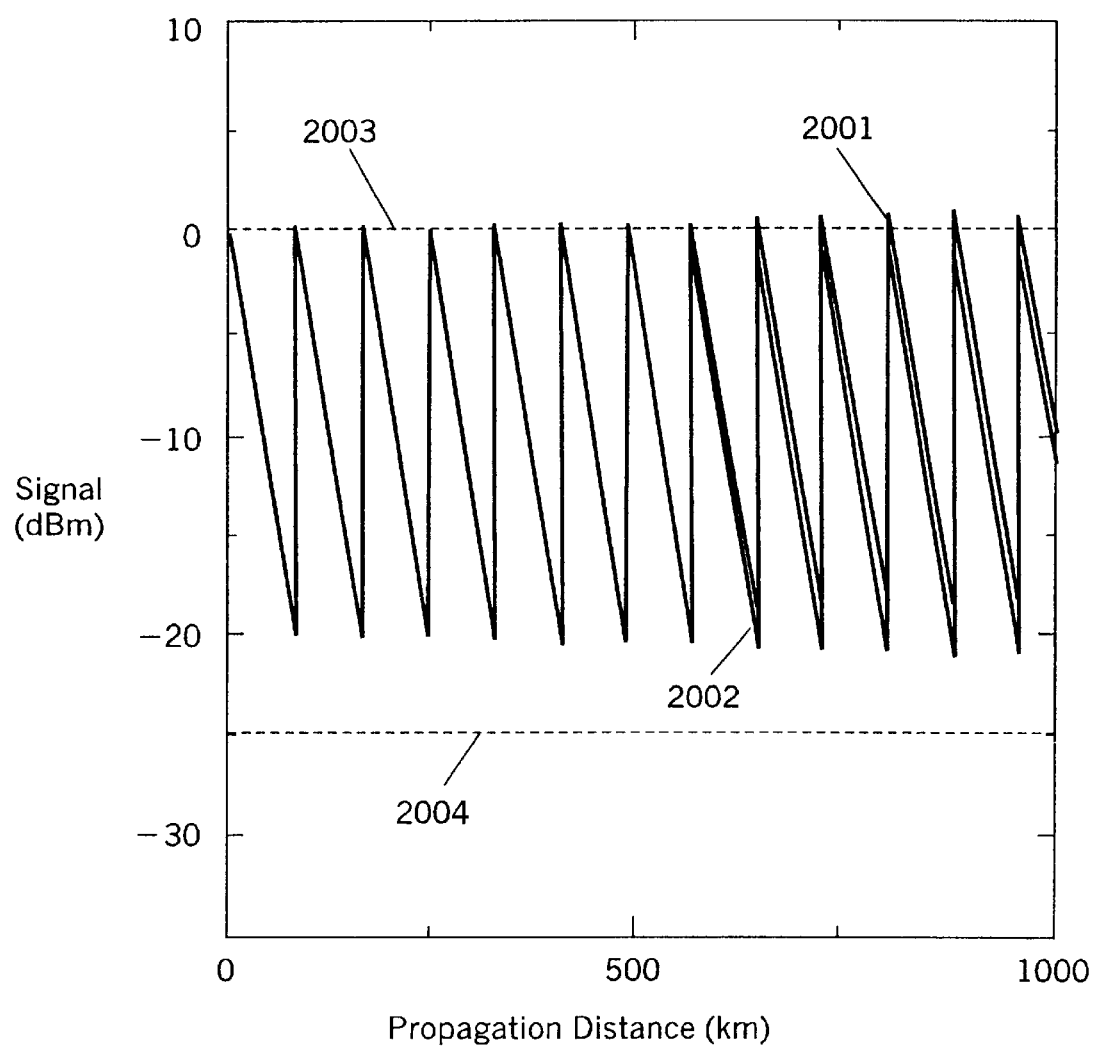
FIG. 20 illustrates power equalization for another type of network which employs the present invention.

FIGS. 19 and 20 show the improved gain equalization that can be achieved using the invention. FIG. 19 is for submarine cable. FIG. 20 is for terrestrial cable. As with FIG. 3, FIG. 19 shows the impact of gain variation with system length for a submarine system. Curve 1901 shows gain for channels that experience a larger than nominal gain, and curve 1902 shows gain for channels that experience a smaller than nominal gain. Adequate signal recovery is assured since the signal levels remain entirely above the detection limit 1904, and below the non-linear limit, 1903. FIG. 20 shows a similar graph, but this time, for terrestrial optical systems. Curve 2002 represents wavelengths decreasing in power and curve 2001 represents wavelengths increasing in power. Operational limits are shown at 2003 and 2004. Although gain equalization is not as good as for submarine cable, it is much improved over what was achievable with the prior art.

We have described specific embodiments of our invention, which provides intelligent, miniaturized, bandwidth modules (BMM's) which subdivide a wide available spectrum into narrow band segments where multiple BMM's can be concatenated together to provide a stepwise constant approximation to a broadband spectrum. One of ordinary skill in the networking and/or electronics and optics arts will quickly recognize that the invention has numerous other embodiments. In fact, many implementations are possible. The following claims are in no way intended to limit the scope of the invention to the specific embodiments described.

We claim:

1. A device for providing controlled gain for a band of optical channels selected from a spectrum of optical channels, the device comprising:

an input block and output block with an optical path in between, the input block and the output block having optical connections, the input block and out put block being operable so that the band of optical channels is directed through the optical path while other bands of optical channels from the spectrum of optical channels can be diverted to connections for one or more additional devices for additional bands of optical channels from within the spectrum of optical channels;

an amplifier disposed between the input block and the output block;

a compensation module connected to the amplifier, the compensation module operable to provide dispersion compensation for the band of optical channels; and a programmable control module connected within the device, the control module operable to control the operation of the device to provide the controlled gain.

2. The device of claim 1 wherein power equalization is provided by the control module varying a current being supplied to a pump laser that is included in the amplifier.

3. The device of claim 1 further comprising:
an attenuator connected to the amplifier; and
an etalon connected to the attenuator so that the etalon and the attenuator are disposed within the optical path, the attenuator also connected to the control module.

4. The device of claim 3 wherein the attenuator is connected to the output of the amplifier.

5. The device of claim 3 wherein the attenuator and the etalon are disposed within the compensation module.

6. The device according to any of claims 1 through 5 wherein the compensation module further comprises connections for a length of dispersion compensating fiber.

7. The device of claim 1 wherein the compensation module further comprises:
an optical circulator connected to the amplifier; and
one or more serially interconnected chirped fiber Bragg gratings connected to the optical circulator, each of the one or more serially interconnected chirped fiber Bragg gratings tuned to provide dispersion compensation for at least one optical channel.

8. The device of claim 7 further comprising one or more attenuators interspersed between two or more of the serially interconnected chirped fiber Bragg gratings so that the compensation module provides power equalization.

9. The device of claim 7 wherein each of the one or more serially interconnected chirped fiber Bragg gratings is characterized by channel-specific reflectivity so that power equalization is provided by the chirped fiber Bragg gratings.

10. The device of claim 7 further comprising a wavelength-dependent loss element connected within the optical path.

11. The device of claim 1 wherein the compensation module further comprises:
an optical circulator connected to the amplifier;
a demultiplexer connected to the optical circulator; and
one or more chirped fiber Bragg gratings connected to the demultiplexer, each of the chirped Bragg gratings tuned to provide dispersion compensation for at least one optical channel.

12. The device of claim 11 further comprising one or more attenuators connected between one or more of the chirped fiber Bragg gratings and the demultiplexer so that gain equalization is provided by the compensation module.

13. The device of claim 11 further comprising a wavelength-dependent loss element connected within the optical path.

14. The device of claim 11 wherein each of the chirped fiber Bragg gratings is characterized by channel-specific reflectivity so that gain equalization is provided by the chirped fiber Bragg gratings.

15. Apparatus for providing controlled gain for a band of optical channels, the apparatus comprising:
means for connection within a network which passes a spectrum of optical channels, so that a band of optical channels is passed through the apparatus and connections are provided for additional apparatus for applying controlled gain to other bands of optical channels from within the spectrum of optical channels;
means for amplifying the band of optical channels, the means for amplifying connected to the means for connection;
means for providing dispersion compensation for the band of optical channels, the means for providing connected to the means for amplifying; and
means for controlling the apparatus, the means for controlling being programmable to control the operation of the apparatus to provide the controlled gain.

16. A bandwidth-management system for use in an optical network, the band width-management system comprising two or more concatenated devices, each device for processing a different one of a selected band of channels from a spectrum of channels being carried by the optical network, each of the devices further comprising:
an input block and output block with an optical path in between, the input block and the output block connected so that the selected band of channels passes through the optical path but other bands of channels from the spectrum of channels are passed to other concatenated devices within the bandwidth-management system;
an amplifier disposed between the input block and the output block;
a compensation module connected to the amplifier, the compensation module operable to provide dispersion compensation for the selected band of optical channels; and
a digital control module connected within the device, the digital control module operable to control the operation of the device to provide controlled gain for the band of optical channels.

17. The bandwidth-management system of claim 16 wherein power equalization for at least one of the concatenated devices is provided by the digital control module varying a current being supplied to a pump laser that is included in the amplifier.

18. The bandwidth-management system of claim 16 wherein at least one concatenated device further comprises:
an attenuator connected to the amplifier; and
an etalon connected to the attenuator so that the etalon and the attenuator are disposed within the optical path, the attenuator also connected to the digital control module.

19. The bandwidth-management system of claim 18 wherein the variable attenuator is connected to the output of the amplifier.

20. The bandwidth-management element of claim 18 wherein the variable attenuator and the etalon are disposed within the compensation module.

21. The bandwidth-management element according to any of claims 16 through 20 further comprising a master controller connected to all of the digital control modules of the two or more concatenated devices.

22. The bandwidth-management system of claim 16 wherein the compensation module of at least one of the two or more concatenated devices further comprises:
an optical circulator connected to the amplifier; and
one or more serially interconnected chirped fiber Bragg gratings connected to the optical circulator, each of the one or more serially interconnected chirped fiber Bragg gratings tuned to provide dispersion compensation for at least one optical channel.

23. The bandwidth-management system of claim 22 further comprising one or more attenuators interspersed between two or more of the serially interconnected chirped fiber Bragg gratings so that power equalization is provided by the compensation module.

24. The bandwidth-management system of claim 22 wherein each of the one or more serially interconnected chirped fiber Bragg gratings is characterized by channel-specific reflectivity so that power equalization is provided by the chirped fiber Bragg gratings.

25. The bandwidth-management system of claim 22 further comprising a wavelength-dependent loss element connected within the optical path.

26. The bandwidth-management system of claim 16 wherein the compensation module of at least one of the two or more concatenated devices further comprises:

an optical circulator connected to the amplifier;

a demultiplexer connected to the optical circulator; and one or more chirped fiber Bragg gratings connected to the demultiplexer, each of the chirped Bragg gratings tuned to provide dispersion compensation for at least one optical channel.

27. The band-width-management system of claim 26 further comprising one or more attenuators interspersed between the one or more of the chirped fiber Bragg gratings and the demultiplexer so that power equalization is provided by the compensation module.

28. The bandwidth-management system of claim 26 wherein each of the chirped fiber Bragg gratings is characterized by channel-specific reflectivity so that gain equalization is provided by the chirped fiber Bragg gratings.

29. The bandwidth-management element according to any of claims 22 through 28 further comprising a master controller connected to all of the digital control modules of the two or more concatenated devices.

30. The device of claim 26 further comprising a wavelength-dependent loss element connected within the optical path.

31. A bandwidth-management system for an optical network, the bandwidth-management system characterized by the division of a spectrum of channels being carried by the optical network into a plurality of bands of channels, the bandwidth-management system comprising:

two or more concatenated bandwidth-management modules, each bandwidth-management module having an amplifier and providing power equalization and dispersion compensation for a specific one of the plurality of bands of channels, each bandwidth-management module further including a digital control module for controlling the operation of the bandwidth-management module; and a master controller connected to the digital control module for each of the two or more concatenated bandwidth-management modules, the master controller for controlling the digital control module so that power equalization and dispersion compensation are provided within each band of channels.

32. The bandwidth-management system of claim 31 wherein the dispersion compensation is provided by a plurality of chirped optical fiber gratings.

33. The bandwidth-management system of claim 31 wherein the dispersion compensation is provided by a length of dispersion compensating fiber.

34. The bandwidth-management system according to any of claims 31 through 33 wherein power equalization is provided by the digital control module varying a current being supplied to a pump laser that is included in the amplifier.

35. The bandwidth-management system according to any of claims 31 through 33 wherein power equalization is provided by one or more loss elements.

36. The bandwidth-management system of claim 32 wherein each of the chirped fiber Bragg gratings is characterized by channel-specific reflectivity so that power equalization is provided by the chirped fiber Bragg gratings.

* * * * *